Sept. 25, 1928.  1,685,442
E. WILDHABER ET AL
METHOD OF PRODUCING BEVEL GEARS
Filed June 3, 1926   4 Sheets-Sheet 1

INVENTORS
*Ernest Wildhaber*
*& Allan H. Candee*

ATTORNEY

Sept. 25, 1928.
E. WILDHABER ET AL
1,685,442
METHOD OF PRODUCING BEVEL GEARS
Filed June 3, 1926
4 Sheets-Sheet 2

INVENTORS
Ernest Wildhaber
& Allan H. Candee
BY
ATTORNEY

Sept. 25, 1928.

E. WILDHABER ET AL 1,685,442

METHOD OF PRODUCING BEVEL GEARS

Filed June 3, 1926    4 Sheets-Sheet 4

INVENTORS
Ernest Wildhaber
& Allan H. Candee
BY
ATTORNEY

Patented Sept. 25, 1928.

1,685,442

UNITED STATES PATENT OFFICE.

ERNEST WILDHABER AND ALLAN H. CANDEE, OF ROCHESTER, NEW YORK, ASSIGNORS TO GLEASON WORKS, OF ROCHESTER, NEW YORK, A CORPORATION OF NEW YORK.

METHOD OF PRODUCING BEVEL GEARS.

Application filed June 3, 1926. Serial No. 113,550.

The present invention relates to bevel gears and to an improved method of producing such gears. In particular this invention relates to the production of bevel gears having teeth which extend along lines which are inclined to the straight generatrices of the pitch surfaces of the gears, and especially this invention relates to gears which are produced with a rotary face mill cutter.
The primary object of this invention is to provide a method for generating bevel gears through which the gears may be provided with tooth surfaces of any desired lengthwise and transverse curvature.
A further object of the invention is to provide a method for generating bevel gears in which the pressure angle of the pinion may be made to match the pressure angle of the gear from end to end of the teeth so that the so-called "bias bearing" may be eliminated.

Other objects of the invention will be apparent hereinafter from the specification and from the recital of the appended claims.

It is well recognized that when a pair of curved tooth gears are produced with completely conjugate teeth giving, as is said, full bearing contact, these gears will not operate satisfactorily if mounted to run an appreciable distance in any direction out of the exact position for which the gears were cut. In practice, therefore, some allowance is made for errors in mounting and for the deflection of the shafts and bearing which occurs when the gears are under load. This allowance can only be provided by modifying the curvature of the working surfaces of the teeth. The modification of the tooth surfaces should be made in two directions, namely, lengthwise of the teeth, and transversely, that is, in the direction of the tooth profile. The lengthwise modification in teeth of circular form is accomplished by changing the cutter radius, and is known as radial mismatching. There has been little attempt heretofore, however, to modify the tooth profiles of curved tooth bevel gears. With the machines and methods in general use, this could be done only by changing the profile of the tool cutting edges or by changing the dedendum angle when generating a gear. The first method is objectionable because it requires a departure from the simple straight edged cutters. In the second method the degree of modification is extremely limited and the results are uncertain. Our invention, however, provides a method in which the cutters preferably have straight cutting edges and in which any practical degree of profile modification can be obtained.

In spiral bevel gears as heretofore produced, it is frequently found that the area of bearing contact extends obliquely or diagonally of the tooth surface. This condition is known as "bias bearing" and is undesirable because it is unquestionably one of the causes of the noisy operation of gears. The present invention not only provides a method by which any degree of modification of tooth curvature is possible but it also enables the complete elimination of bias bearing.

In the preferred form of the present invention, the gear or larger member of the pair is produced according to the usual method of generating curved tooth bevel gears, namely, by a rolling motion between the tool and blank in the manner of a gear rolling with a crown gear, either a true 90° pitch angle gear or a nominal crown gear having a slightly conical pitch surface. In this method of generation, the tool represents the basic gear and the rolling motion between the tool and blank takes place about an axis which intersects the blank axis in its apex. The pinion, however, instead of being generated in the usual manner, is produced by a rolling motion in the manner of a gear rolling with a crown gear whose axis is offset from the apex of the gear. This method of production results in a modification of the tooth profiles of the pinion over the methods heretofore employed and a pair produced in the manner described no longer have completely conjugate tooth surfaces.

When a pair of curved tooth bevel gears are generated so that the teeth are completely conjugate, there is full bearing contact and at any instant the mating teeth are in "line contact". But when the lengthwise and profile curvatures of either mating tooth surface are modified, the condition approaches "point contact". Practically there is always an appreciable area of contact at each instant of action between mating teeth. With the present invention, it is possible to control the direction in which this area of contact moves on the tooth surface and the extent to which it reaches. The theoretical point of contact is caused to move lengthwise of the teeth and substantially midway of their height, thus eliminating the diagonal or "bias" bearing.

A pair of gears constructed according to the preferred embodiment of this invention, the preferred method of producing such gears and of proportioning the members of a pair are illustrated in the accompanying drawings, in which:

Figure 9 is a diagrammatic view showing the method of determining the relation between the pinion and the imaginary generating gear from which it is produced.

Figure 1:
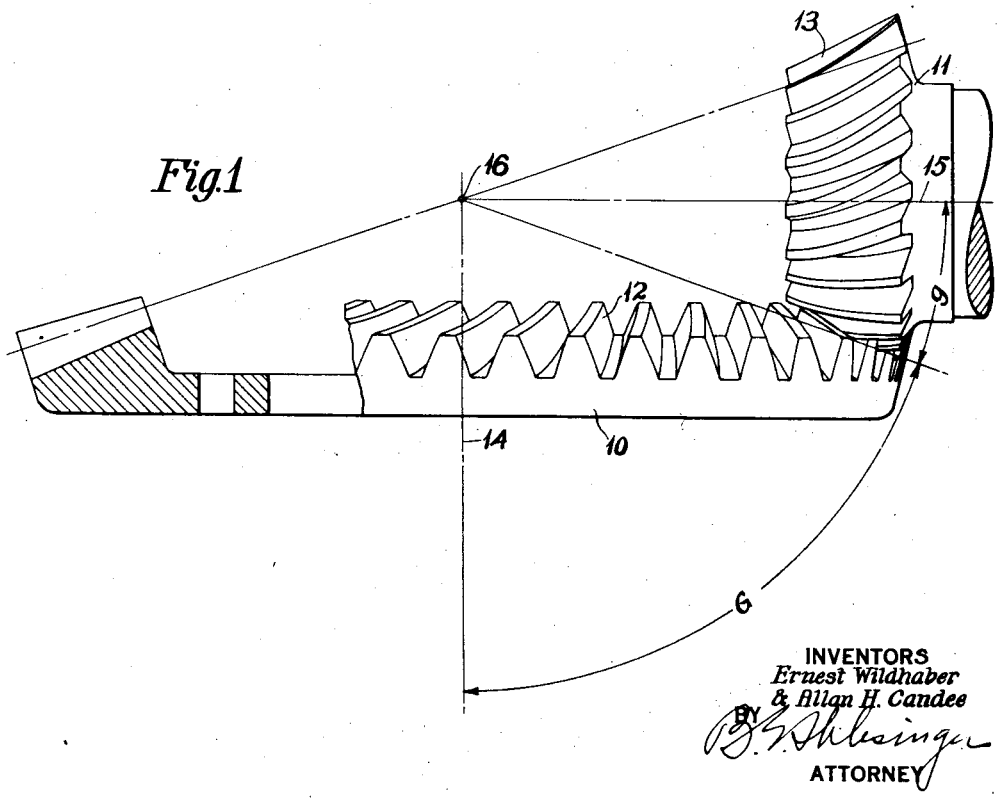
Figure 1 is a side elevation, partly in section, of a pair of bevel gears constructed according to the preferred embodiment of this invention.

Figure 1 shows a pair of curved tooth bevel gears constructed according to the preferred form of this invention. The gear or larger member of the pair is indicated at 10, and the pinion or smaller member of the pair at 11. These gears are provided with longitudinally curved teeth 12 and 13 respectively. Their axes 14 and 15, respectively, intersect in the common apex 16. The pitch angle of the pinion is indicated at $g$ and the pitch angle of the gear at $G$.

Figure 3:
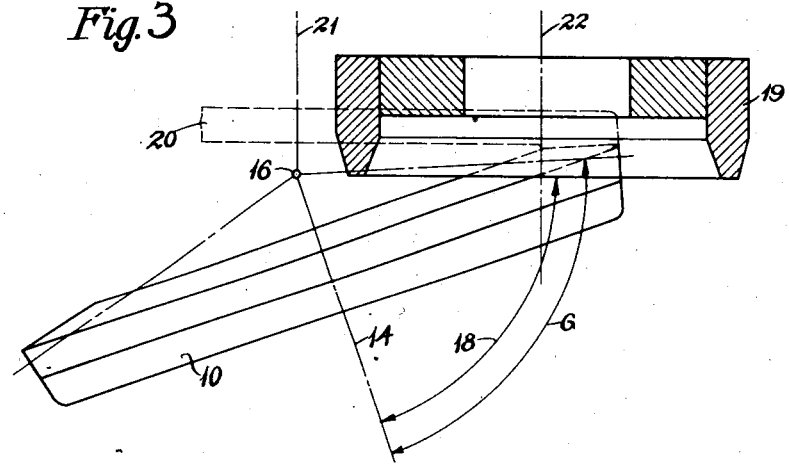
Figure 3 is a diagrammatic view illustrating the preferred method of producing the gear or larger member of the pair.

The gear is preferably produced in accordance with the usual practice as illustrated in Figure 3. The blank is set to its root angle 18 and the cutter 19 which is preferably in the form of a rotary annular face mill is properly adjusted into engagement with the blank. The generation of the tooth surfaces is effected by a rotary movement of the cutter on its axis 22 combined with a rolling movement of the tool and blank relatively to each other in the manner of a gear meshing with a basic gear 20 which the tool represents. In this rolling movement the blank rotates on its axis 14 and the tool and blank are simultaneously moved relative to each other about an axis 21 intersecting the axis 14 of the blank in its apex 16 and representing the axis of the basic gear 20. When the tool and blank are set in the manner described the pitch angle of the imaginary generating gear 20 is less than 90°, substantially by the amount of the dedendum angle, that is, by the amount of the difference between the angle $G$ and the angle 18. It is understood, of course, that one tooth surface, or a pair of adjacent tooth surfaces, is generated at a time and that the gear is then indexed and the operation repeated until the work is completed.

This method of producing the gear by a rolling movement on an imaginary gear which is an approximate crown gear can be carried out on a Gleason spiral bevel gear generator without modification of that machine, and for this reason is our preferred method. It will be understood, however, that our invention is equally applicable where the gear is generated from an imaginary gear which is a true crown gear with a pitch angle of 90°.

Figure 4:
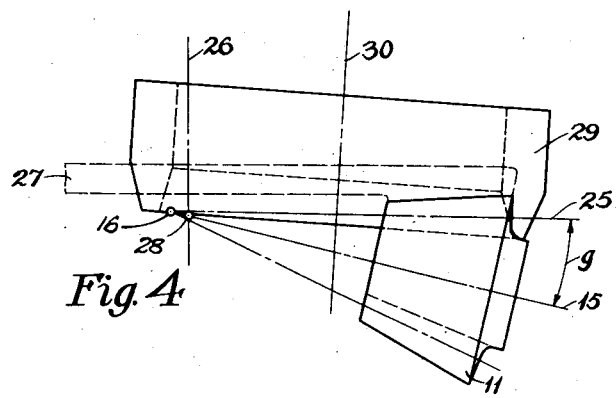
Figures 4 and 5 are a side elevation and a plan view, respectively, illustrating diagrammatically the preferred method of producing the pinion or smaller member of the pair.
Figure 5:
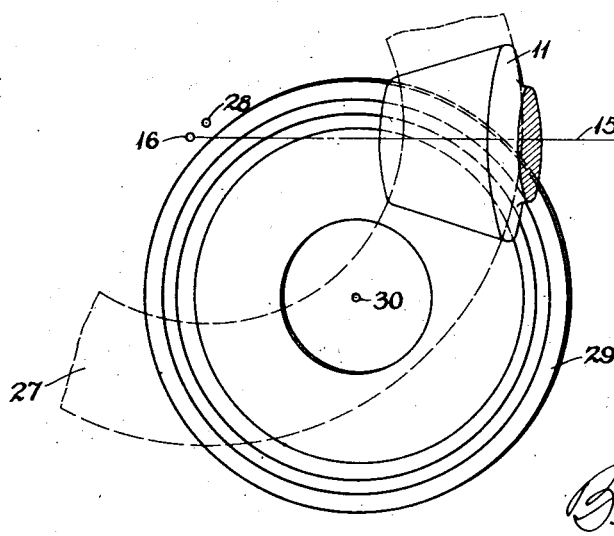

The preferred method of generating the pinion is illustrated diagrammatically in Figures 4 and 5. Here the pinion 11 is set with its axis 15 making an angle equal to its pitch angle $g$ with a plane 25 which is perpendicular to the axis 26 of the imaginary basic gear 27 with which the pinion blank is rolled. In this case, the basic gear 27 is a true crown gear, namely, a gear whose pitch surface is a plane. Contrary to the method heretofore employed in producing bevel pinions, however, the pinion is so set that its apex 16 is offset from the center or apex 28 of the imaginary crown gear and preferably, also, with its axis 15 offset from the axis 26 of the imaginary crown gear. For generating the tooth surfaces of the pinion, the cutter 29, which represents the imaginary basic gear 27, is rotated on its axis 30 in engagement with the pinion blank, while the blank is rotated on its axis 15 and while simultaneously a further relative rotary movement is imparted between the tool 29 and the blank 11 about the axis 26 of the basic gear 27, the pinion blank apex 16 and preferably the pinion blank axis 15, also, being maintained all the while in offset relation to the axis 26. Preferably one tooth surface is generated at a time and then the blank is indexed and the operation repeated until all the work is completed. This method of generating a bevel pinion from a crown gear whose axis is offset from the pinion apex or axis can be performed on a machine such as described in the copending application of Ernest Wildhaber, Serial No. 77,130, filed December 23, 1925.

Figure 2:
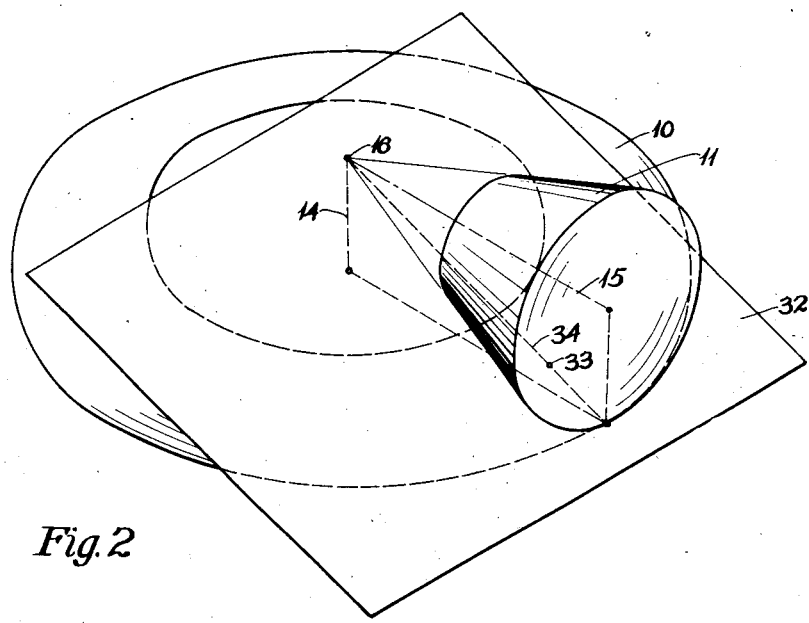
Figure 2 is a diagrammatic view showing such a pair in perspective and illustrating the position of a plane tangent to their pitch surfaces along their common cone element.
Figure 6:
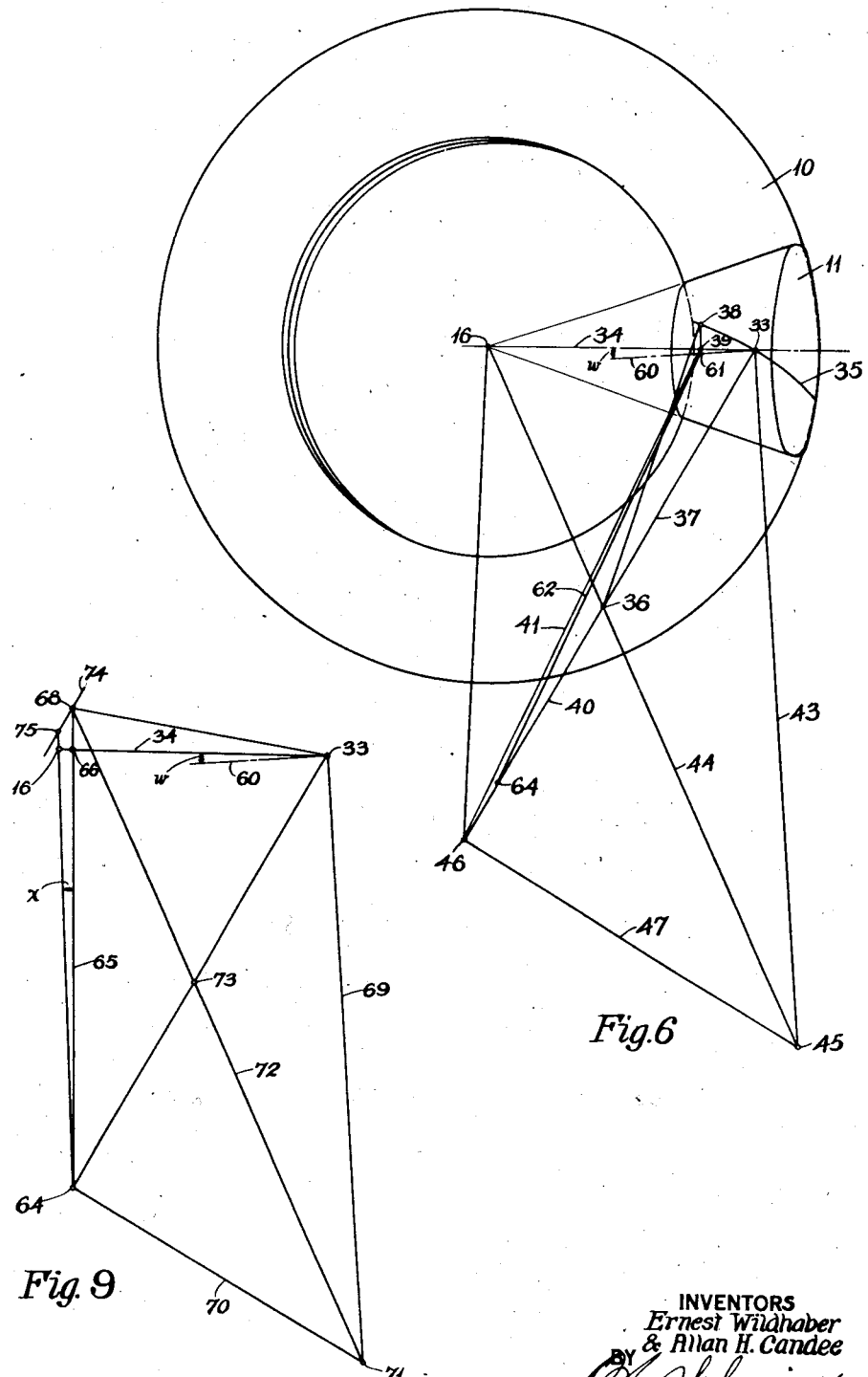
Figure 6 is a diagrammatic view showing the relationship between a pair of gears constructed according to this invention and the method of determining their construction.

The manner in which the required settings of tool and blank are determined in order to secure tooth surfaces on the pinion of the desired curvature will now be described. Referring now to Figure 6. This figure shows the relationship of the longitudinal tooth curves, the tooth normals, etc., when projected into a plane tangent to the pitch surfaces of gear and pinion along a common cone element. Such a plane is indicated at 32 in Figure 2. The line 34 indicates a common cone element of the two gears and is the line along which the pitch surfaces of gear and pinion are tangent. The circular arc 35, Figure 6, passing through the point 33, which is a point of contact between mating tooth surfaces at a distance from the common apex 16 equal to the average cone distance of the gears, represents the position of a spiral tooth such as would be cut on the gear by a rotary cutter whose center is at 36 and which has a radius 37. This line 35 is the intersection of the cutter with the pitch plane 32. The angle formed at 33 between the direction of the tooth and the line 34 is the spiral angle $h$ and the angle 16—33—36 is the complement of this angle.

In order to eliminate "bias bearing", it is required that when the gears rotate together the point of contact between the gears shall remain in the pitch plane 32, that is, that the point of contact shall move along the line 34, which, hence, is a line of action between the conjugate tooth curves. 38 represents some other point on the arc 35 which is produced simultaneously with the point 33. After some slight rotation of the gears 10 and 11 in mesh, it is required in order that the points of contact move along the line 34 and remain in the pitch plane 32, that the point 38 move to the point 39 which becomes a new point of contact between the gears.

The line 40 passing through the center 36 of the cutter is the normal to the tooth curve 35 at the contact point 33 projected into the pitch plane 32. When the point of contact has moved to 39, the projected normal will have moved to the position 41. Inasmuch as very small distances are considered, the movement of the projected normal from the position 40 to the position 41 may be considered as an elementary motion, that is, as a turning motion about an instantaneous center. The end point of the normal moves on the line 34. Hence the instantaneous center of said motion must be on a line 43 drawn perpendicular to the line of action 34 at the point 33. The point 36 of the normal, furthermore, moves about the apex 16 at right angles to the line 44 connecting the point 36 with the apex 16. The intersection 45 of lines 43 and 44 is, therefore, the instantaneous center of the normal 40. Furthermore a pitch point 46 can be located by drawing the line 47 from the point 45 perpendicular to the line 40.

In order that contact between the teeth may occur along the line 34 lying in the pitch plane, thus avoiding "bias bearing" the pressure angles of gear and pinion must be equal at all points along this line 34. It is necessary, therefore, to determine the pressure angles of the gear at the points 33 and 39. At point 33 which is taken midway the tooth, the pressure angle is specified in the beginning and the gear cutter is chosen accordingly. The pressure angle at the point 33 may be designated as $a$. Since the cutter axis is inclined to the pitch plane, the pressure angle at 38 will be different than at 33. It remains now to determine the pressure angle at the point 38 which after some slight rotation of the gears moves to the point 39.

Figure 7:
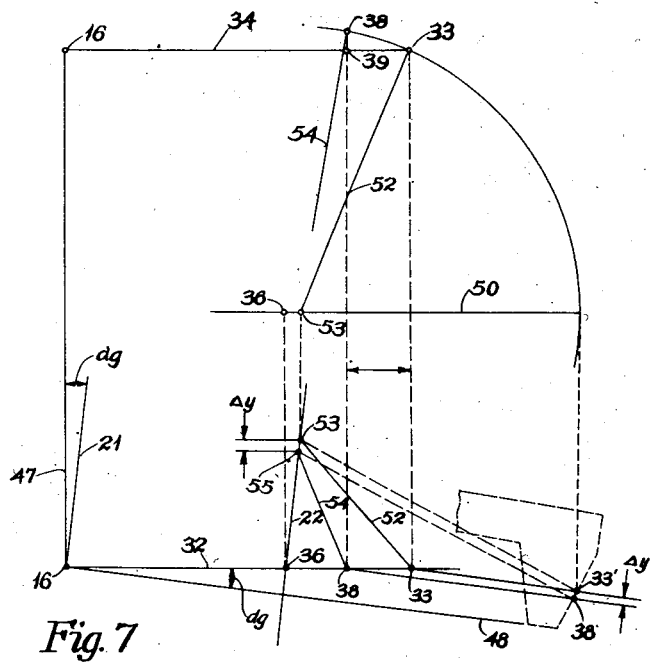
Figures 7 and 8 are diagrammatic views illustrating further steps in proportioning a pair of gears according to this invention.

Referring now to Figure 7. This figure shows two projections, of which the upper projection is a portion of the diagram of Figure 6 lying in the pitch plane, while the lower projection is a projection in a plane perpendicular to the pitch plane and parallel to the gear axis. As previously stated, the tool employed in cutting the gear is set to the root plane, the axis 21 of the imaginary generating gear being inclined from the perpendicular 47 to the pitch plane 32 by the amount of the gear dedendum angle $dg$. The root plane 48 is, of course, inclined from the pitch plane 32 by the same angle. The cutter axis 22 is parallel to the generating gear axis 21 and projects into line 50 parallel to line 34. Both axes 21 and 22 are perpendicular to the root plane 48. The cutter axis 22 intersects the pitch plane 32 in the point 36. The normal 52 to the conical cutter surface at the point 33 intersects the cutter axis 22 in the point 53. The length of this normal will be designated as R so that the distance of the point 53 from the pitch plane 32 is $R \sin a$. The normal 54 to the conical cutter surface at the point 38 intersects the cutter axis 21 in a point 55. The true relative positions of the points 33 and 38 in the cutter blade are indicated at 33' and 38'.

Remembering that the dimensions in the diagram are greatly exaggerated, the infinitesimal distance 33—39 is designated as $s$.

Accordingly the perpendicular distance between 33' and 38' is $\Delta y = s\, dg$. The angle $dg$ is here taken in circular measure and since it is always small, it is sufficiently accurate to assume that the arc, sine, and tangent all have the same value. As is apparent from the diagram the point 55 which is the intersection of the normal 54 at point 38 with the cutter axis 22, is perpendicularly distant from the point 53 by the distance $y$. The difference in the pressure angles at the points 38 and 33 can be calculated as follows:

Let:
$a$ = the pressure angle at 33
$a'$ = the pressure angle at 38
$\Delta a$ = the difference in pressure angles
$\Delta \sin a$ = the difference in the sines of the pressure angles
$r$ = the cutter radius in the pitch plane Then:

$$R \sin a' = R \sin a - \Delta y$$

$$\sin a' - \sin a = -\frac{\Delta y}{R}$$

$$\Delta \sin a = -\frac{s}{R} dg$$

$$\Delta a = \frac{\Delta \sin a}{\cos a}$$

$$\Delta a = \frac{s}{R \cos a} dg$$

$$r = R \cos a$$

$$\Delta a = -\frac{s}{r} dg$$

$$a' = a - \frac{s}{r} dg.$$

The diagram and the above analysis apply to the outside blade of the cutter. For the inside blade:

$$\Delta a = +\frac{s}{r} dg$$

and $$a' = a + \frac{s}{r} dg.$$

Figure 8:
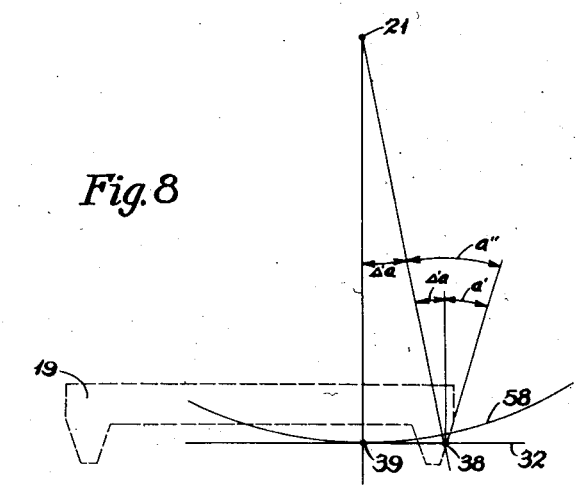

The value of the pressure angle $a'$ at the point 38 as determined by the above equations is referred to the pitch plane 32. The imaginary generating gear from which the bevel gear is generated has a conical pitch surface, as previously stated, the pitch angle being $90° - dg$. The pitch surface of the generating gear 20 is tangent to the pitch plane 32 of the diagrams along the line 34. At point 38, therefore, the pitch surface 58 of the generating gear 20 and the pitch plane 32 are not tangent (see Figure 8) and accordingly the pressure angle at the point 38 referred to the pitch surface 58 of the generating gear 20 is different from the pressure angle at this point referred to the pitch plane 32. Figure 8 is a diagrammatic sectional view taken along the line 38—39 perpendicular to the pitch plane. The gear cutter 19 has a pressure angle at the point 38 referred to the pitch plane 32 equal to $a'$. From Figure 6 it will be seen that the distance 38—39 equals $s \tan h$. The change in the direction of the pitch surface 58 between the points 33 and 38 is indicated as $\Delta' a$, and it is evident, if $a''$ is the pressure angle at the point 38 referred to the pitch surface 58, that:

$$a'' = a' + \Delta' a.$$

Furthermore, it is found that $$\Delta' a = \frac{\text{distance 38—39}}{A \tan (90° - dg)} \cos h$$

or $$\Delta' a = \frac{s}{A} \sin h \tan dg$$

where A is the cone distance 16—33. Inasmuch as the distance $s$ is infinitesimal:

$$\Delta' a = \frac{s}{A} \sin h \cdot dg$$

Then:

$$a'' = a' + \frac{s}{A} \sin h \cdot dg.$$

This equation is for the outside blade of the cutter. For the inside blade the signs change and:

$$a'' = a' - \frac{s}{A} \sin h \cdot dg.$$

Since $$a' = a - \frac{s}{r} dg,$$

$$a'' = a - \frac{s}{r} dg + \frac{s}{A} \sin h \cdot dg,$$

which is the equation for the pressure angle of the gear at the point 39 in the line of action 34. The last two equations are for the outside blade of the cutter. For the inside blade the signs change.

From the above analysis, it will be clear that the pressure angle of the gear tooth is different at the point 39 in the line of action from that at the point 33. If bias bearing is to be eliminated, the pressure angle of the pinion tooth surface at point 39 must be different from its pressure angle at point 33 and the difference must be the same as between these two points on the surface of the gear tooth. It is necessary, therefore, to consider next the pressure angle of the pinion. If the pinion were generated according to the methods heretofore employed, namely, with the line of action between the pinion and the imaginary generating gear extending along the line 34, the difference in pressure angle for the pinion tooth between the points 33 and 38 would be:

$$\Delta a = \pm \frac{s}{r} dp$$

by an analysis exactly similar to that employed in considering the gear, $dp$ being the dedendum angle of the pinion. Where, as in the preferred embodiment of this invention, the pinion is generated by a rolling motion in which the blank rolls on a true crown gear with a plane pitch surface, the pressure angle of the crown gear and of the pinion itself at the point 39 would be:

$$a3 = a \pm \frac{s}{r} dp$$

The pressure angles of the gear and pinion at the point 39 would be accordingly different. This difference in pressure angle is what causes the bias bearing in bevel gears cut in the usual manner. According to our discovery, the difference in pressure angle can be avoided by generating the pinion along a line of action different from the line 34 with pressure angles at different points such that when these points are rotated into positions lying on the line 34 they will have the same pressure angles as the gear at those points.

In Figure 6, 60 designates the line of action along which the pinion may be generated. This line of action is inclined away from the line 34 by a small angle $w$. At point 61 in this line of action the pinion has the same pressure angle referred to the pitch plane as the cutter. At point 61, however, the pitch surface of the pinion is no longer tangent to the pitch plane 32, and the condition is analogous to that at the point 38 and illustrated in Figure 8. The change in direction of the pitch surface of the pinion relative to the pitch plane between the points 33 and 61 may designated as $\Delta'' a$, and:

$$\Delta'' a = \frac{\text{distance } 61\text{—}39}{A \tan g} \cos h$$

or $$\Delta'' a = \frac{s}{A} \frac{\tan w}{\tan g} \cos h.$$

At the point 61, the pressure angle $a_4$ of the pinion referred to its pitch surface is:

$$a_4 = a_3 \pm \Delta'' a.$$

In order to eliminate bias bearing, however, the pressure angle of the pinion at the point 61 referred to its pitch surface must equal that of the gear at point 38 referred to its pitch surface, so that when the point 61 has rotated to the point 39 and the point 38 has also rotated to the point 39, the pressure angles of gear and pinion will be equal and the gear and pinion will be in contact along the line of action 34. As this line of action 34 is midway the height of the teeth thereby bias bearing will be completely eliminated. Hence it is required that: $a_4 = a''$, whence:

$$\frac{s}{A} \frac{\tan w}{\tan g} \cos h = \frac{s}{r}(dp+dg) - \frac{s}{A} \sin h \cdot dg$$

and $$\tan w = \frac{\tan g}{\cos h} \left[ \frac{A}{r}(dp+dg) - \sin h \cdot dg \right].$$

The last equation gives us the proper value of the angle $w$ so that when the pinion has been generated from its crown gear along a line of action 60, making an angle $w$ with the required line of action 34 between the gear and pinion, the pressure angle of the pinion at the point 61 though different from that of the gear at the point 39 becomes equal to it when the pinion rotates through the distance 61—39.

The particular equation given above for $\tan w$ is correct only for cutters of the conical type, that is, cutters having straight cutting edges, but similar equations can be derived for cutters with curved cutting edges.

It remains now to determine the manner of positioning the pinion blank relative to the generating crown gear so as to generate the pinion along the line of action 60. Referring to Figure 9. This figure is again a diagrammatic view in the pitch plane. This diagram can be used for solving the problem graphically and determining thus the location of the crown gear center or axis relative to the pinion apex. A more accurate solution can be obtained, however, by calculating the required dimensions based upon the analysis of this figure. The reference numerals already employed designate similar parts in this figure, the point 16 designating here the pinion apex. Line 62 designates a normal projected in the tangent plane, to the longitudinal tooth curve of the pinion at point 61. Normals to the longitudinal tooth curve produced on the pinion at adjacent points 33 and 61 in the line of action 60 will intersect in a common point 64. Let the distance 33—64 be B'. This distance is found to be:

$$B' = \frac{A \cos(h+w)}{\cos w \left[ \frac{A}{B} \cos h - \tan w \left(1 \mp \frac{\tan a}{\tan g} \sin h\right)\right]}$$

In this equation B is the distance 33—46, shown in Figure 6, and is equal to $$B = \frac{A \; r \cos^2 h}{A - r \sin h}$$

In Figure 9, the angle 33—64—16 will be called $b$ and $$\cot b = \frac{B'}{A \cos h} - \tan h.$$

If the line of action when generating the pinion had the direction of the line 34, the center of the crown gear would be at 16, but since the line of action is some line 60 inclined to the line 34, the crown gear center must lie at some point offset from the pinion apex 16. It can be proven that the crown gear center must lie on a line 65 inclined away from the line 64—16 by a small angle $x$ which can be determined from the following equation:

$$\cot x = \cot b \pm \frac{\cos h}{\cos (b-h) \sin b} \frac{\cos (h+w)}{\sin w} \frac{\tan g}{\tan a}.$$

In Figure 9, the line 65 is shown in the position it would occupy for the outside blade of the cutter. For the inside blade $x$ changes its algebraic sign and the line 65 would lie on the opposite side of the apex 16. This means that the opposite sides of the teeth of the pinion must be generated from different crown gears.

Ordinarily the center of the crown gear would be taken at point 66 where the line 65 intersects the line 34. When, however, the center of the crown gear is offset from the line 34, either above or below that line, as at the point 68, the curvature of the tooth profiles of the pinion is altered and by varying the amount of offset it is possible to modify the tooth profiles and the depth of tooth bearing on the tooth surface to any desired extent while still using a cutter having straight-sided cutting edges to generate the pinion. This is a very important feature of the present invention as it enables the tooth profile to be varied at will and still use the simple straight-sided cutting tools.

With the crown gear center located at 68, it is necessary now to determine the radius of the cutter to be used so as to produce teeth on the gear which are so longitudinally curved as to give the desired contact between the crown gear and pinion. The location of the cutter center can be determined by the methods of descriptive geometry in a way analogous to that employed in determining the location of the instantaneous center 45 in Figure 6. At the point 33 draw the line 69 perpendicular to the line of action 60. At point 64 draw a line 70 perpendicular to the line 64—33. Connect the intersection 71 of these two perpendiculars 69 and 70 with the point 68. The intersection of the line 72, thus drawn, with the line 64—33 gives the location 73 of the cutter center and the distance 73—33 is the cutter radius.

Finally from point 68 a line 74 is drawn which intersects the line 64—16 at 75. The ratio of roll between the pinion and the crown gear equals, $$\frac{\text{distance } 64-75}{(\text{distance } 64-16) \sin g}$$

In cutting the pinion, the direction of the pinion cutter axis is so adjusted that at the point 33 the pressure angle produced on the pinion is the same as that produced on the gear.

In order to modify the lengthwise curvature of the pinion teeth it is only necessary to use a cutter with a radius slightly different from the cutter radius 73—33.

In the preceding description, the bevel gear was assumed to be cut in the usual manner and the tooth surfaces of the pinion were modified from the usual form by generating with a crown gear whose axis did not intersect the apex of the pinion. It is obvious, of course, that the method could be reversed and the pinion cut in the usual manner while the gear was cut according to the improved method.

While the present invention has been described particularly with reference to the production of bevel gears having teeth curved longitudinally along circular arcs, it will be understood that this invention applies to the generation of bevel gears in which the tooth curvature is of any nature and in general to the generation of bevel gears whose teeth extend along lines which are longitudinally inclined to the straight generatrices of the pitch surfaces of the gears. It will be understood also that this invention is applicable also to the grinding and lapping of gears and that when the term "cutting" is employed, it is intended to cover these methods of production also.

In general, it may be said, that, while we have described one preferred embodiment of our invention, the invention is capable of further modification within its limits and the scope of the appended claims, and that this application is intended to cover any variations, uses, or adaptations of our invention following, in general, the principles of the invention and including such departures from the present disclosure as come within known or customary practice in gear cutting and may be applied to the essential features hereinbefore set forth and as fall within the scope of the appended claims.

Having thus described our invention what we claim is:

1. The method of producing a bevel gear which consists in generating its side tooth surfaces by imparting a relative motion between a tool and a gear blank in the manner of a tapered gear meshing with a basic gear, other than its mate, with its axis offset from the axis of the basic gear while effecting a relative movement between the tool and blank to produce teeth on the blank which extend along lines inclined to the straight generatrices of the pitch surface of the blank.

2. The method of producing a bevel gear which consists in generating its side tooth surfaces by imparting a relative motion between a tool and a gear blank in the manner of a tapered gear meshing with a basic gear, other than its mate, with its apex offset from the axis of the basic gear, while effecting a relative movement between the tool and blank to produce teeth on the blank which extend along lines inclined to the straight generatrices of the pitch surface of the blank.

3. The method of producing a bevel gear which consists in producing teeth on the blank which extend along lines longitudinally inclined to the straight generatrices of the pitch surface of the blank in a generating operation in which the blank is rotated on its axis and simultaneously the tool and blank are moved relatively to each other about an axis offset from the blank apex.

4. The method of producing a bevel gear which consists in cutting teeth on the blank which extend along lines longitudinally inclined to the straight generatrices of the pitch surface of the blank during a generating operation in which the blank is rotated on its axis and simultaneously the tool and blank are moved relatively to each other about an axis offset from the blank axis.

5. The method of producing a bevel gear which consists in cutting its side tooth surfaces by moving a tool in a curved path across the face of a gear blank while rotating the blank on its axis and simultaneously imparting a further relative movement between the tool and blank about an axis offset from the blank axis.

6. The method of producing a bevel gear which consists in cutting its side tooth surfaces by rotating a tool, having a plurality of annularly arranged cutting blades, in engagement with a gear blank while rotating the blank on its axis and simultaneously imparting a further relative movement between the tool and blank about an axis offset from the blank axis.

7. The method of producing a bevel gear which consists in cutting its side tooth surfaces by moving a tool in a curved path across the face of a gear blank while rotating the blank on its axis and simultaneously imparting a further relative movement between tool and blank about an axis which is offset from the apex of the blank.

8. The method of producing a bevel gear which consists in cutting its side tooth surfaces by rotating a tool, having a plurality of annularly arranged cutting blades, in engagement with a gear blank while rotating the blank on its axis and simultaneously imparting a further relative movement between the tool and blank about an axis which is offset from the apex of the blank.

9. The method of producing a bevel gear which consists in cutting its side tooth surfaces by moving a tool in a curved path across the face of a gear blank while rolling the tool and blank relatively to each other in the manner of a gear meshing with a crown gear with its axis offset from the axis of the crown gear.

10. The method of producing a bevel gear which consists in cutting its side tooth surfaces by rotating a tool, having a plurality of annularly arranged cutting blades, in engagement with a gear blank while rolling the tool and blank relatively to each other in the manner of a gear meshing with a crown gear with its axis offset from the axis of the crown gear.

11. The method of producing a bevel gear which consists in cutting its side tooth surfaces by moving a tool in a curved path across the face of a gear blank while rolling the tool and blank relatively to each other in the manner of a gear meshing with a crown gear with its apex offset from the axis of the crown gear.

12. The method of producing a bevel gear which consists in cutting its side tooth surfaces by rotating a tool, having a plurality of annularly arranged cutting blades, in engagement with a gear blank while rolling the tool and blank relatively to each other in the manner of a gear meshing with a crown gear with its apex offset from the axis of the crown gear.

13. The method of producing a pair of bevel gears which consists in cutting the side tooth surfaces of one member of the pair by imparting a relative rolling motion between a tool and a gear blank in the manner of a gear rolling on a basic gear whose axis intersects the axis of the blank, while effecting a relative movement between the tool and blank to produce teeth on the blank which extend along lines inclined to the straight generatrices of the pitch surface of the blank, and in producing the tooth surfaces of the other member of the pair by imparting a relative rolling motion between a tool and a gear blank in the manner of a gear rolling on a basic gear with its axis offset from the axis of the basic gear, while effecting a relative movement between the tool and blank to produce teeth on the blank which extend along lines inclined to the straight generatrices of the pitch surface of the blank.

14. The method of producing a pair of bevel gears which consists in generating the side tooth surfaces of one member of the pair by imparting a relative rolling motion between a tool and a gear blank in the manner of a gear rolling on a basic gear whose axis is offset from the apex of the blank, while effecting a relative movement between the tool and blank to produce teeth on the blank which extend along lines inclined to the straight generatrices of the pitch surface of the blank, and in generating the side tooth surfaces of the other member of the pair by imparting a relative rolling motion between a tool and a gear blank in the manner of a gear rolling on a basic gear whose axis intersects the axis of the blank in its apex, while effecting a relative movement between the tool and blank to produce teeth on the blank which extend along lines inclined to the straight generatrices of the pitch surface of the blank.

15. The method of producing a pair of bevel gears which consists in cutting the side tooth surfaces of one member of the pair by moving a tool in a curved path across the face of a gear blank while rotating the blank on its axis and simultaneously imparting a further relative movement between the tool and blank about an axis intersecting the blank axis, and in cutting the side tooth surfaces of the other member of the pair by moving a tool in a curved path across the face of a gear blank while rotating the blank on its axis and simultaneously imparting a further relative movement between the tool and blank about an axis offset from the blank axis.

16. The method of producing a pair of bevel gears which consists in cutting the side tooth surfaces of one member of the pair by moving a tool in a curved path across the face of a gear blank while rotating the blank on its axis and simultaneously imparting a further relative movement between the tool and blank about an axis intersecting the blank axis in its apex, and in cutting the side tooth surfaces of the other member of the pair by moving a tool in a curved path across the face of a gear blank while rotating the blank on its axis and simultaneously imparting a further relative movement between the tool and blank about an axis offset from the blank apex.

17. The method of producing a pair of bevel gears which consists in cutting the side tooth surfaces of one member of the pair by rotating a tool, having a plurality of annularly arranged cutting edges, in engagement with a gear blank while rotating the blank on its axis and simultaneously imparting a further relative movement between the tool and blank about an axis intersecting the blank axis, and in cutting the side tooth surfaces of the other member of the pair by rotating a tool, having a plurality of annularly arranged cutting edges, in engagement with a gear blank while rotating the blank on its axis and simultaneously imparting a further relative movement between the tool and blank about an axis offset from the blank axis.

18. The method of producing a pair of bevel gears which consists in cutting the side tooth surfaces of one member of the pair by rotating a tool, having a plurality of annularly arranged cutting edges, in engagement with a gear blank while rotating the blank on its axis and simultaneously imparting a further relative movement between the tool and blank about an axis intersecting the blank axis in the blank apex, and in cutting the side tooth surfaces of the other member of the pair by rotating a tool, having a plurality of annularly arranged cutting edges, in engagement with a gear blank while rotating the blank on its axis and simultaneously imparting a further relative movement between the tool and blank about an axis offset from the blank apex.

19. The method of producing a bevel gear having teeth extending longitudinally along lines inclined to the straight generatrices of its pitch surface, which consists in generating one side surface of the teeth by imparting a relative rolling motion between a tool and the gear blank, during cutting, in the manner of a gear meshing with a basic gear with its axis offset from the axis of the basic gear, and in generating the opposite side faces of the teeth by imparting a relative rolling motion between a tool and the blank, during cutting, in the manner of a gear meshing with a basic gear, other than the first gear, with its axis offset from the axis of the basic gear.

20. The method of producing a bevel gear having teeth extending longitudinally along lines inclined to the straight generatrices of its pitch surface, which consists in generating one side surface of the teeth by imparting a relative rolling motion between a tool and the gear blank, during cutting, in the manner of a gear meshing with a basic gear with its apex offset from the axis of the basic gear, and in generating the opposite side faces of the teeth by imparting a relative rolling motion between a tool and the blank, during cutting, in the manner of a gear meshing with a basic gear, other than the first gear, with its apex offset from the axis of said basic gear.

21. The method of producing a bevel gear having teeth extending longitudinally along lines inclined to the straight generatrices of the pitch surface, which consists in generating one side of the teeth by imparting a relative rolling motion between a tool and the gear blank, during cutting, in the manner of a gear meshing with a basic gear, and in generating the opposite sides of the teeth by imparting a relative rolling motion between a tool and the gear blank, during cutting in the manner of a gear meshing with a basing gear other than the first basic gear, the axis of the blank being maintained during one of these operations, at least, offset from the axis of the basic gear with which it rolls.

22. The method of producing a bevel gear having teeth extending longitudinally along lines inclined to the straight generatrices of its pitch surface, which consists in generating one side face of the teeth by imparting a relative rolling motion between a tool and the gear blank, during cutting, in the manner of a gear meshing with a basic gear, and in generating the opposite sides of the teeth by imparting a relative rolling motion between a tool and the gear blank, during cutting, in the manner of a gear meshing with a basic gear other than the first basic gear, the apex of the blank being maintained during at least one of these operations offset from the axis of the basic gear with which it is being rolled.

23. The method of producing a bevel gear which consists in cutting one side face of the teeth of the gear by moving a tool in a curved path across the face of a gear blank while imparting a relative rolling motion between the tool and blank in the manner of a gear meshing with a basic gear with its axis offset from the axis of the basic gear, and in producing the opposite sides of the teeth of the blank by moving a tool in a curved path across the face of the blank while imparting a relative rolling movement between the tool and blank in the manner of a gear meshing with a basic gear, other than the first named basic gear, with its axis offset from the axis of said last named basic gear.

24. The method of producing a bevel gear which consists in cutting one side face of the teeth of the gear by moving a tool in a curved path across the face of a gear blank while imparting a relative rolling motion between the tool and blank in the manner of a gear meshing with a basic gear with its apex offset from the axis of the basic gear, and in producing the opposite sides of the teeth of the blank by moving a tool in a curved path across the face of the blank while imparting a relative rolling movement between the tool and blank in the manner of a gear meshing with a basic gear, other than the first named basic gear, with its apex offset from the axis of said last named basic gear.

25. The method of producing a bevel gear which consists in cutting one side face of the teeth of the gear by moving a tool in a curved path across the face of a gear blank while imparting a relative rolling motion between the tool and blank in the manner of a gear meshing with a crown gear with its axis offset from the axis of the crown gear, and in producing the opposite sides of the teeth of the blank by moving a tool in a curved path across the face of the blank while imparting a relative rolling movement between the tool and blank in the manner of a gear meshing with a crown gear, other than the first crown gear, with its axis offset from the axis of said last named crown gear.

26. The method of producing a bevel gear which consists in cutting one side face of the teeth of the gear by moving a tool in a curved path across the face of a gear blank while imparting a relative rolling motion between the tool and blank in the manner of a gear meshing with a crown gear whose axis is offset from the apex of said gear, and in producing the opposite sides of the teeth of the blank by moving a tool in a curved path across the face of the blank while imparting a relative rolling movement between the tool and blank in the manner of a gear meshing with a crown gear, other than the first crown gear, with its apex offset from the axis of said last named crown gear.

27. The method of producing a bevel gear which consists in cutting one side face of the teeth of the gear by moving a tool in a curved path across the face of a gear blank while imparting a relative rolling motion between the tool and blank in the manner of a gear meshing with a crown gear, and in producing the opposite sides of the teeth of the blank by moving a tool in a curved path across the face of the blank while imparting a relative rolling movement between the tool and blank in the manner of a gear meshing with a different crown gear.

28. The method of producing a pair of bevel gears which consists in cutting the side tooth surfaces of one member of the pair by imparting a relative rolling motion between a tool and a gear blank in the manner of a gear rolling on a basic gear whose axis intersects the axis of the blank, while effecting a relative cutting movement between the tool and the blank to produce teeth on the blank which extend along lines inclined to the straight generatrices of the pitch surface of the blank and in producing the tooth surfaces of the other member of the pair by imparting a relative motion between a tool and a gear blank in the manner of a gear meshing with a crown gear whose axis is offset from the axis of the blank, while effecting a relative cutting motion between the tool and blank to produce teeth on the blank which extend along lines inclined to the straight generatrices of the pitch surface of the blank.

29. The method of producing a pair of bevel gears which consists in cutting the side tooth surfaces of one member of the pair by imparting a relative rolling motion between a tool and a gear blank in the manner of a gear rolling on a basic gear whose axis intersects the axis of the blank in its apex, while effecting a relative cutting motion between the tool and blank to produce teeth on the blank which extend along lines inclined to the straight generatrices of the pitch surface of the blank, and in producing the tooth surfaces of the other member of the pair by imparting a relative motion between a tool and a gear blank in the manner of a gear meshing with a crown gear whose axis is offset from the blank apex, while effecting a relative cutting movement between the tool and blank to produce teeth on the blank which extend along lines inclined to the straight generatrices of the pitch surface of the blank.

30. The method of producing a pair of bevel gears which consists in cutting the side tooth surfaces of one member of the pair by moving a tool in a curved path across the face of a tapered gear blank while rotating the blank on its axis and simultaneously imparting a further relative movement between the tool and blank about an axis intersecting the blank axis, and in cutting the side tooth surfaces of the other member of the pair by moving a tool in a curved path across the face of a tapered gear blank while producing a relative movement between the latter tool and blank corresponding to that of a gear meshing with a crown gear whose axis is offset from the blank axis.

31. The method of producing a pair of bevel gears which consists in cutting the side tooth surfaces of one member of the pair by moving a tool in a curved path across the face of a tapered gear blank while rotating the blank on its axis and simultaneously producing a further relative movement between the tool and blank about an axis intersecting the blank axis in its apex, and in cutting the side tooth surfaces of the other member of the pair by moving a tool in a curved path across the face of a tapered gear blank while simultaneously producing a further relative movement between the tool and blank corresponding to that of a gear meshing with a crown gear whose axis is offset from the apex of the blank.

32. The method of producing a pair of bevel gears which consists in cutting the side tooth surfaces of one member of the pair by rotating a tool, having a plurality of annularly arranged cutting edges, in engagement with a tapered gear blank while rotating the blank on its axis and simultaneously imparting a further relative movement between the tool and blank about an axis intersecting the blank axis, and in cutting the side tooth surfaces of the other member of the pair by rotating a tool, having a plurality of annularly arranged cutting edges, in engagement with a tapered gear blank while simultaneously producing a relative movement between the tool and blank corresponding to that of a gear meshing with a crown gear whose axis is offset from the axis of the blank.

33. The method of producing a pair of bevel gears which consists in cutting the side tooth surfaces of one member of the pair by rotating a tool, having a plurality of annularly arranged cutting edges, in engagement with a tapered gear blank, while rotating the blank on its axis and simultaneously imparting a further relative movement between the tool and blank about an axis intersecting the blank axis in its apex, and in cutting the side tooth surfaces of the other member of the pair by rotating a tool, having a plurality of annularly arranged cutting edges, in engagement with a tapered gear blank while simultaneously producing a relative movement between the latter tool and blank corresponding to that of a gear meshing with a crown gear whose axis is offset from the blank apex.

34. The method of producing a bevel gear which consists in cutting one side face of the teeth of the gear by rotating a tool, having a plurality of annularly arranged cutting edges, in engagement with a tapered gear blank while imparting a relative rolling motion between the tool and blank corresponding to that of a gear meshing with a crown gear whose axis is offset from the apex of the blank, and in cutting the opposite sides of the teeth of the blank by rotating a tool, having a plurality of annularly arranged cutting edges, in engagement with the blank while imparting a relative rolling motion between the tool and blank in the manner of a gear meshing with a crown gear other than the first crown gear, whose axis is offset from the apex of the blank.

35. The method of producing a bevel gear which consists in cutting one side face of the teeth of the gear by rotating a tool, having a plurality of annularly arranged cutting edges in engagement with a tapered gear blank while producing a relative motion between the tool and blank corresponding to that of a gear meshing with a crown gear whose axis is offset from the axis of the blank, and in producing the opposite sides of the teeth of the blank by rotating a tool, having a plurality of annularly arranged cutting edges, in engagement with the blank while producing a relative movement between the tool and blank corresponding to that of a gear meshing with a crown gear, other than the first crown gear, whose axis is offset from the axis of the blank.

36. The method of producing a bevel gear which consists in cutting its side tooth surfaces by moving a tool in a curved path across the face of a tapered gear blank while producing a relative movement between the tool and blank corresponding to that of a tapered gear meshing with a basic gear, other than its mate, whose axis is offset from the axis of the blank.

37. The method of producing a bevel gear which consists in cutting its side tooth surfaces by moving a tool in a curved path across the face of a tapered gear blank while producing a relative movement between the tool and blank corresponding to that of a tapered gear meshing with a basic gear, other than its mate, whose axis is offset from the apex of the blank.

38. The method of producing a pair of bevel gears, which consists in cutting the side tooth surfaces of one member of the pair by moving a tool in a curved path across the face of a tapered gear blank while producing a relative rolling movement between the tool and blank corresponding to that of a tapered gear rolling with a basic gear, other than its mate, whose axis intersects the axis of the blank in its apex, and in producing the side tooth surfaces of the other member of the pair by moving a tool in a curved path across the face of a tapered gear blank while producing a relative movement between the latter tool and blank corresponding to that of a tapered gear meshing with a basic gear, other than its mate, whose axis is offset from the axis of the blank.

39. The method of producing a pair of bevel gears, which consists in cutting the side tooth surfaces of one member of the pair by moving a tool in a curved path across the face of a tapered gear blank while producing a relative movement between the tool and blank corresponding to that of a tapered gear meshing with a basic gear, other than its mate, whose axis intersects the axis of the blank in its apex, and in cutting the side tooth surfaces of the other member of the pair by moving a tool in a curved path across the face of a tapered gear blank while producing a relative movement between the latter tool and blank corresponding to that of a tapered gear meshing with a basic gear, other than its mate, whose axis is offset from the apex of the blank.

ERNEST WILDHABER.
ALLAN H. CANDEE.